(12) United States Patent
Fujishita (10) Patent No.: US 7,734,871 B2
(45) Date of Patent: *Jun. 8, 2010

(54) REMOVABLE MEDIUM APPARATUS AND CONTROL METHOD THEREOF

(75) Inventor: Masahiro Fujishita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 542 days.

This patent is subject to a terminal disclaimer.

(21) Appl. No.: 11/563,879

(22) Filed: Nov. 28, 2006

(65) Prior Publication Data

US 2007/0124537 A1    May 31, 2007

(30) Foreign Application Priority Data

Nov. 28, 2005  (JP) ............................. 2005-341488

(51) Int. Cl.
*G06F 12/00* (2006.01)
(52) U.S. Cl. ...................... 711/115; 711/164
(58) Field of Classification Search ................ None
See application file for complete search history.

(56) References Cited

U.S. PATENT DOCUMENTS

| | | | |
|---|---|---|---|
| 6,336,585 B1 | 1/2002 | Harada | |
| 6,338,048 B1 | 1/2002 | Mori | |
| 7,014,105 B2 | 3/2006 | Fujioka | |
| 7,219,832 B2 | 5/2007 | Fillinger et al. | |
| 7,336,788 B1 * | 2/2008 | Hendricks | 380/239 |
| 2002/0114461 A1 * | 8/2002 | Shimada et al. | 380/201 |
| 2002/0138754 A1 * | 9/2002 | Himeno | 713/200 |
| 2003/0167395 A1 * | 9/2003 | Chang et al. | 713/183 |
| 2006/0294104 A1 * | 12/2006 | Morrison et al. | 707/9 |

FOREIGN PATENT DOCUMENTS

| | | |
|---|---|---|
| CN | 1263305 A | 8/2000 |
| JP | 2003-196241 A | 7/2003 |

OTHER PUBLICATIONS

United States Patent and Trademark Office, Office Action in U.S. Appl. No. 11/559,677 mailed Nov. 26, 2008.

* cited by examiner

*Primary Examiner*—Hiep T Nguyen
(74) *Attorney, Agent, or Firm*—Baker Botts L.L.P.

(57) ABSTRACT

A removable-medium apparatus having a memory unit that stores a plurality of ID information for accessing a removable medium, and a receiving unit that receives an instruction for specifying ID information from among the plurality of ID information stored in the memory unit. The removable-medium apparatus determines whether or not ID information that is entered matches the ID information that is specified by the receiving unit, and outputs data that is stored on the removable medium when it is determined that the entered ID information matches the specified ID information, and does not output data that is stored on the removable medium when it is determined that the entered ID information does not match the specified ID information.

22 Claims, 8 Drawing Sheets

REMOVABLE MEDIUM APPARATUS AND CONTROL METHOD THEREOF

CROSS-REFERENCE TO RELATED APPLICATIONS

The Nonprovisional application claims priority under 34 U.S.C. §119(a) on Patent Application No. 2005-341488 filed in Japan on Nov. 28, 2005, the entire contents of which are hereby incorporated by reference.

BACKGROUND

The present invention relates to a removable-medium apparatus and control method thereof, and more particularly to a removable-medium apparatus and control method thereof that are capable of preventing data stored on a removable medium from leaking over a network.

Data such as image data that was taken by a digital camera, or text that was created by a computer is stored on a memory card that can be freely mounted or removed (removable medium). That memory card is mounted in a card reader (removable medium apparatus) that is connected to a network, and the data that is stored on the memory card is read and inputted to a computer that is also connected to the network.

However, in order to increase security when transmitting or receiving data over the network, the user must input a user name and password, and access is allowed only when the correct user name and password are inputted. Therefore, the user must correctly input the user name and password each time when accessing the data. In Japanese Patent Application Laid Open No. 2003-196241, an apparatus is disclosed in which in order to improve the convenience of the work of inputting the user name and password, after the user name and password have been inputted one time, that information is stored on an IC card, and every time after that the apparatus uses the card to automatically set that information.

SUMMARY

However, in the case of a company network or the like where a plurality of computers and a card reader are connected to the network, when a user that uses one of the plurality of computers is able to access the card reader, it is possible for that user to read the data that is stored on a memory card. It is possible to set a password for the card reader so that only users that know the password can access the card reader, however, a user that knows the password to the card reader may not always be a user that is allowed to access the data that is stored on the memory card.

Therefore, there is a problem in that since there are different kinds of data such as information related to personnel, personal information and the like, all of the users that know the password to the card reader may access all of the data that is stored on a memory card that is mounted in the card reader, so there is a possibility that confidential information could be leaked.

An object of the present invention is to solve the aforementioned problem by providing a removable-medium apparatus and control method thereof that are capable of preventing leaking of data that is stored on a removable medium that is mounted in the removable-medium apparatus.

In order to accomplish this object, a removable-medium apparatus that outputs data that is stored on a removable medium, comprises: a memory unit that stores a plurality of ID information for accessing the removable medium; a receiving unit that receives an instruction for specifying ID information from among the plurality of ID information that is stored in the memory unit; a judgment unit that determines whether or not ID information that is entered matches the ID information that is specified through the receiving unit; and a control unit that performs a control so that data that is stored on the removable medium is outputted when the judgment unit determines that the entered ID information matches the specified ID information, and so that data that is stored on the removable medium is not outputted when the judgment unit determines that the entered ID information does not match the specified ID information.

When ID information is specified from among the plurality of ID information that is stored in the memory unit, and judgment is performed to determine whether or not ID information that is entered matches the specified ID information, and when it is determined that the entered ID information matches the specified ID information, control is performed so that data that is stored on the removable medium is outputted, and when it is determined that the entered ID information does not match the specified ID information, control is performed so that data that is stored on the removable medium is not outputted. Data that is stored on the removable medium is sent only to the device that enters the ID information that has been specified from among the ID information that is stored in the removable-medium apparatus. Therefore, it is possible to prevent data that is stored on the removable medium from being leaked to anyone other than certain users.

Also, a removable-medium apparatus in which a removable medium is mounted that stores data and a plurality of ID information for access, and which outputs data that is stored on the removable medium, comprises: a receiving unit that receives an instruction for specifying ID information from among the plurality of ID information that is stored on the removable medium; a judgment unit that determines whether or not ID information that is entered matches the ID information that is specified through the receiving unit; and a control unit that performs a control so that data that is stored on the removable medium is outputted when the judgment unit determines that the entered ID information matches the specified ID information, and so that data that is stored on the removable medium is not outputted when the judgment unit determines that the entered ID information does not match the specified ID information.

When ID information is specified from among the plurality of ID information that is stored on the removable medium, and judgment is performed to determine whether or not ID information that is entered matches the specified ID information, and when it is determined that the entered ID information matches the specified ID information, control is performed so that the data that is stored on the removable medium is outputted, and when it is determined that the entered ID information does not match the specified ID information, control is performed so that the data that is stored on the removable medium is not outputted. Therefore, it is possible for just the device that enters the ID information that has been specified from among the plurality of ID information that is stored on the removable medium to obtain the data that is stored on the removable medium, and thus it is possible to prevent data from being leaked.

The above and further objects and features of the invention will be more fully apparent from the following detailed description with accompanying drawings.

DETAILED DESCRIPTION OF THE EXEMPLARY EMBODIMENTS

Figure 1:
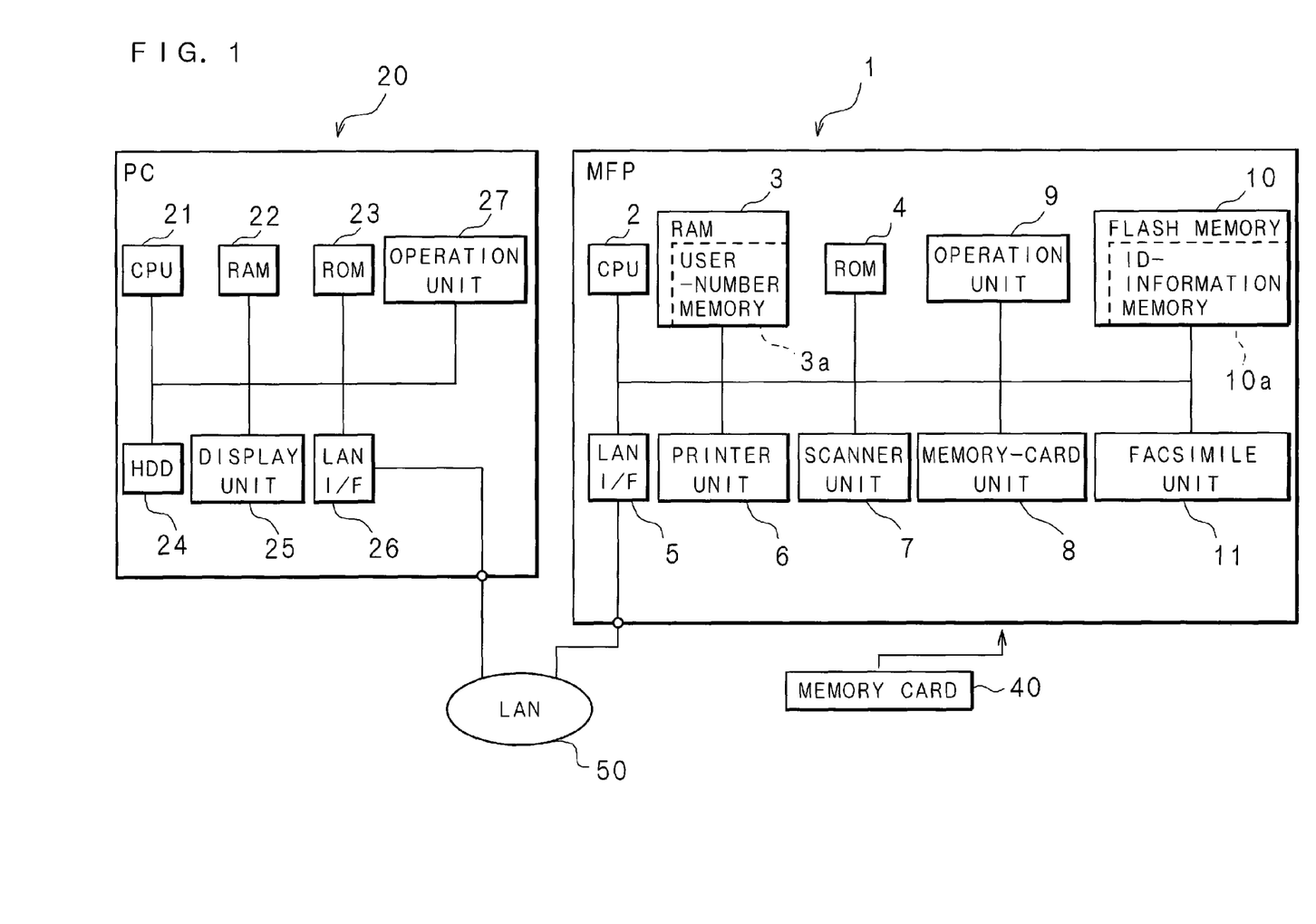
FIG. 1 is a block diagram showing the construction of a communication system that includes a multi-function peripheral apparatus.

The present invention will be described below based on drawings that show the preferred embodiments. FIG. 1 is a block diagram showing the construction of a communication system comprising a multi-function peripheral apparatus (hereafter referred to as MFP) 1, and a personal computer (hereafter referred to as PC) 20 that are connected via a local area network (LAN) 50.

The MFP 1 comprises various functions such as a photo-media-capture function, printer function, copy function, scanner function, facsimile function and the like in one unit. As shown in FIG. 1, the MFP 1 comprises mainly: a CPU 2 that controls all of the operations of the MFP 1; RAM 3, which is a memory for temporarily storing data necessary for the various processings that are executed by the CPU 2; ROM 4 that stores various control programs that are executed by the CPU 2 and fixed-value data; an LAN interface (hereafter abbreviated as LAN I/F) 5; a printer unit 6; a scanner unit 7; a memory-card unit 8; an operation unit 9 having a plurality of operation-input keys (buttons, switches, etc.) for making the MFP 1 execute various functions; a flash memory 10; and a facsimile unit 11 that sends or receives image data via a telephone line (not shown in the figure).

The CPU 2 is a processor that executes various programs that are stored in the ROM 4. The RAM 3 is a random access memory that has a work area for temporarily storing variables and the like when the CPU 2 executes various programs. The RAM 3 comprises a user-number memory 3a that stores user numbers as a kind of variable that are specified by users. As will be described later, a user number is a number that specifies ID information from among ID information that correspond to a plurality of user and that is stored in the flash memory 10a.

The operation unit 9 comprises a plurality of switches and a display on a control-input panel, and the user can send instructions to the MFP 1 by operating the switches. The switches comprise: mode-selection keys 9h to 9k that are used for selecting various functions, such as the copy function, scanner function, facsimile function and the like (see FIG. 2); and a ten-key pad that makes it possible to input numbers and letters. By operating the mode switch it is possible to set a photo-media-capture mode that executes the photo-media-capture function, a copy mode that executes the copy function, a scanner mode that executes the scanner function, and a facsimile mode that executes the facsimile function. Also, by operating the ten-key pad it is possible to input numbers for sending facsimiles, or to input a user number for specifying ID information. The display displays setting screens that show the various settings (see FIG. 2).

The flash memory 10 is a nonvolatile memory to which various data can be written and from which data can be read, and it comprises an ID-information memory 10a that stores ID information made up a user name and password. A user name, for example, contains a user number that is expressed using numbers such as 'user03', and by inputting that user number through the operation unit 9 it is possible to specify corresponding ID information.

When any ID information is specified, that ID information is stored in the user-number memory 3a of RAM 3, and only when ID information that corresponds to that user number is entered via the LAN 50 and is verified, the data stored on the memory card 40 is sent to the device that sent that ID information.

In this embodiment, the ID information is specified before the memory card 40 is mounted in the memory-card unit 8. The reason for this is that when construction is such that ID information is specified from among a plurality of ID information after the memory card 40 has been mounted, there is a possibility that data stored on the memory card 40 could be leaked during the time after the memory card 40 is mounted until the ID information can be specified.

The LAN I/F 5 is an interface with the LAN 50 network. In this embodiment, FTP (File Transfer Protocol) is used to perform communication. When the MFP 1 is set to the photo-media-capture mode, the MFP 1 can send data that is stored on the memory card 40 that is mounted in the memory-card unit 8 to a PC 20 that is connected to the LAN 50 via the LAN I/F 5.

The printer unit 6 is an ink-jet type printer for printing on paper that is set in a specified paper-supply position (not shown in the figure) according to an instruction from the CPU 2, and comprises: a paper-feed motor (not shown in the figure) that feeds the paper, a printing head (not shown in the figure) that sprays ink on the paper, and a carriage motor (not shown in the figure) that moves a carriage (not shown in the figure) in which the printing head is mounted. When the MFP 1 is set to the photo-media-capture mode, the printer can print data such as images or text that are stored on the memory card 40 that is mounted in the memory-card unit 8.

The scanner unit 7 reads an image from an original document that is set at a specified reading position (not shown in the figure) according to instruction from the CPU 2, and creates image data for that image. The image data that is read by the scanner unit 7 is sent to the PC 20 via the LAN 50.

Also, when the MFP 1 is set to the copy mode, the printer unit 6 prints image data that is created by the scanner unit 7 on the paper. Furthermore, when the MFP 1 is set to the scanner mode that activates the scanner function of the MFP 1, the image data that is created by the scanner unit 7 is stored in a specified memory space in the RAM 3.

The memory-card unit 8 comprises a slot in which it is possible to freely mount or remove various kinds of memory cards 40, and it reads data that is stored on a memory card 40 that is mounted in the slot, or writes new data to it. When the MFP1 is set to the photo-media-capture mode, the MFP 1 can read the data stored on the memory card 40 that is mounted in the memory-card unit 8, and print that data by way of the printer unit 6, or send the data that is read from the memory card 40 to the PC 20 via the LAN 50.

The memory card 40 has a flash memory which can be written over, and that retains stored data even when the power is turned OFF, with various types made by various companies (for example, SD card or xD card) being available. This memory card 40 stores data such as image data taken by a digital camera, or text data created by a computer or the like.

When accessing data that is stored on the memory card 40 from the PC 20 via the LAN 50, ID information is entered from the PC 20 and the MFP 1 receives that ID information and performs verification to determine whether or not that ID information matches the ID information that is stored in a specified space in RAM 3. When as a result of the verification performed it is determined that both the user name and password match, the data that is stored on the memory card 40 is allowed to be sent to the PC 20, and when the user name or password does not match, the data is not sent to the PC 20.

The facsimile unit 11 sends image data that is read by the scanner unit 7 or data that is received via the LAN 50 over a telephone line, prints data that is received over a telephone line by way of the printer unit 6, or sends data to the PC 20 via the LAN 50.

Next, an explanation about the PC 20 is given. The PC 20 comprises: a CPU 21; RAM 22, which is a memory for temporarily storing required data and programs for the various processing executed by the CPU 21; ROM 23 that stores various control programs that are executed by the CPU 21 and fixed-value data; a rewritable non-volatile hard disk (HDD) 24 that stores various settings; an operation unit 27 having a keyboard with a plurality of operation-input keys for setting various functions and a mouse; a display unit 25 having a liquid-crystal display that displays various information; and an LAN I/F 26 that is an LAN interface for connecting to the LAN 50.

In addition to the OS (Operating System), various application programs are installed on the hard disk 24. Examples of application programs are programs for accessing a memory card 40 that is mounted in the memory-card unit 8 of the MFP 1 via the LAN 50 and performing processing such as obtaining data that is stored on the memory card 40, or a browser that downloads HTML files, image files, music files or the like via the Internet, and analyzes then displays or reproduces the layout.

Figure 2:
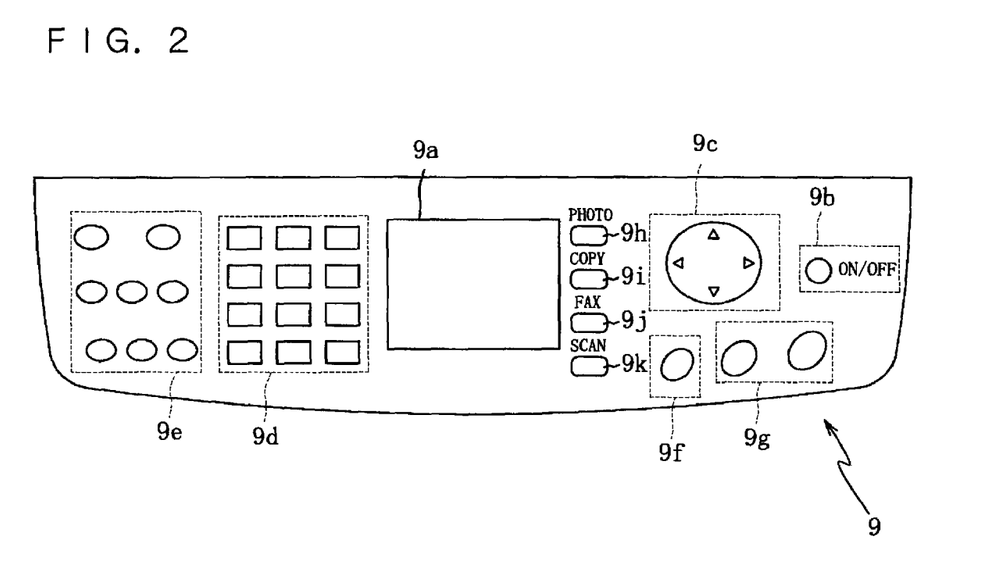
FIG. 2 is a top view of the operation unit of a multi-function peripheral apparatus.

Next, the operation panel section, or in other words, the operation unit 9 of the MFP1 will be explained with reference to FIG. 2. FIG. 2 is a top view of the operation unit 9 of the MFP 1. As shown in FIG. 2, this operation unit 9 comprises a display screen 9a and various operation-input keys 9b to 9k.

The display screen 9a is a liquid-crystal display (LCD) that displays various information of the MFP1. Setting displays are displayed on this display screen 9a for setting functions and settings during function setting as mentioned above.

The operation-input key 9b is the power button, and when it is pressed when the power to the MFP 1 is OFF, the power to the MFP 1 is turned ON, and when operation-input key 9b is pressed when the power to the MFP 1 is ON, the power to the MFP 1 is turned OFF.

The operation-input key 9c is a cross key and menu-setting key for setting functions for the MFP 1 to execute, or for setting values from among choices that are displayed on the display screen 9a. By pressing the end sections on the top, bottom, left or right of this operation-input key 9c, it is possible to move the cursor that is displayed on the display screen 9a up, down, left or right. Also, by pressing the center of the operation-input key 9c after the cursor has been placed on a choice that corresponds to desired function or setting value, the function or setting value on which the cursor is placed is set.

On one menu it is possible to select an ID information setting process, which is a process to set new ID information in the ID-information memory 10a or a process to change ID information that is stored in the ID-information memory 10a.

The operation-input keys 9d are numerical keys (ten-key pad), and by inputting a 2-digit user number that corresponds to any of the ID information that is stored in the ID-information memory 10a of the flash memory 10 when the MFP 1 is set to the photo-media capture mode, it is possible to specify ID information. Also, when the MFP 1 is set to the facsimile mode, these keys are used for inputting the telephone number of a destination device where facsimile data is to be sent, or for inputting setting values; and when the MFP 1 is set to the copy mode, these keys are used for inputting the number of copies to be made, etc.

The operation-input keys 9e are setting buttons that are used for giving instructions to execute certain functions in the various modes (for example the on-hook dial function in the facsimile mode). The operation-input key 9f is a start button, and it is used to give an instruction in the facsimile mode or copy mode to start the execution of a designated function.

The operation-input keys 9h to 9k are mode-selection keys, where photo-mode key 9h sets the MFP1 to execute the photo-media-capture function; copy-mode key 9i sets the MFP 1 to execute the copy function; facsimile-mode key 9j sets the MFP 1 to execute the facsimile function; and scan-mode key 9k sets the MFP 1 to execute the scanner function. When any one of these mode-selection keys 9h to 9k is pressed, the MFP 1 is set to execute the function that corresponds to the pressed selection key.

Figure 3:
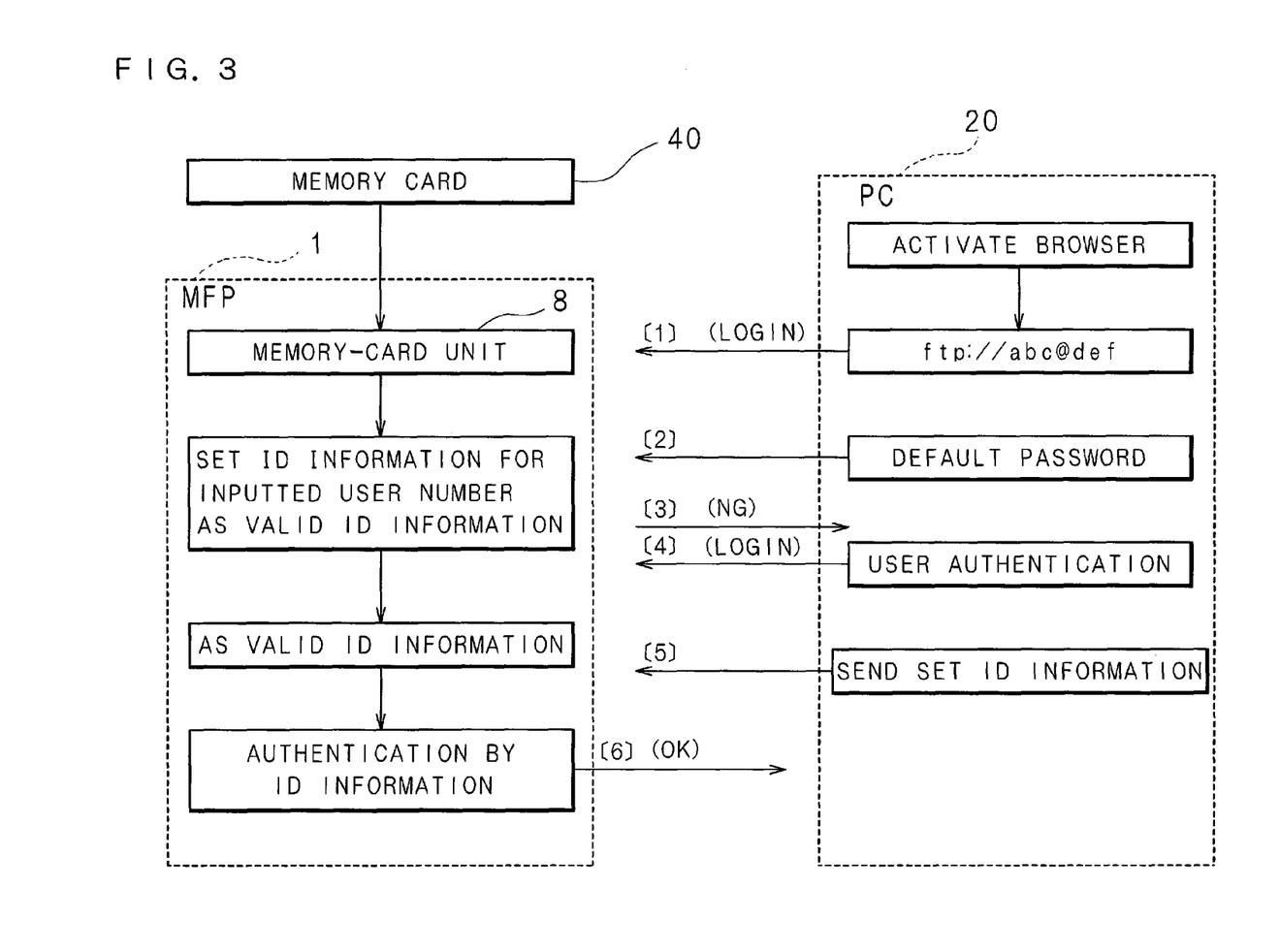
FIG. 3 is a drawing showing the processing that is executed by a multi-function peripheral apparatus and personal computer.

Next, the processing performed by the MFP 1 and PC 20 will be explained with reference to FIG. 3. FIG. 3 is a drawing showing the processing that is executed by the MFP 1 and PC 20.

First, before mounting a memory card 40 in the memory-card unit 8, the user inputting a user number that identifies that user from among a plurality of users (not shown in the figure). After a memory card 40 has been mounted in the memory-card unit 8 of the MFP 1, the ID information that is specified by the user number is set as valid ID information. Next, the browser that is installed in the PC 20 is activated according to operation by the user, and that user requests login to the MFP 1 [1]. The address that is specified at this time is taken to be 'ftp://abc@def'. Here, 'ftp' indicates the MFP 1 that functions as an ftp server, 'abc' is the user name, and 'def' after the @ mark is the node name. When performing login, the browser sends a default password to the MFP 1 [2]. The browser is set to send a preset default password when performing login for the first time.

After the MFP1 receives this user name and default password, it performs verification to check whether they match a valid user name and password. The default password will not match the valid password, so the MFP 1 returns information (NG) to the PC 20 indicating that the password is incorrect [3].

Figure 7:
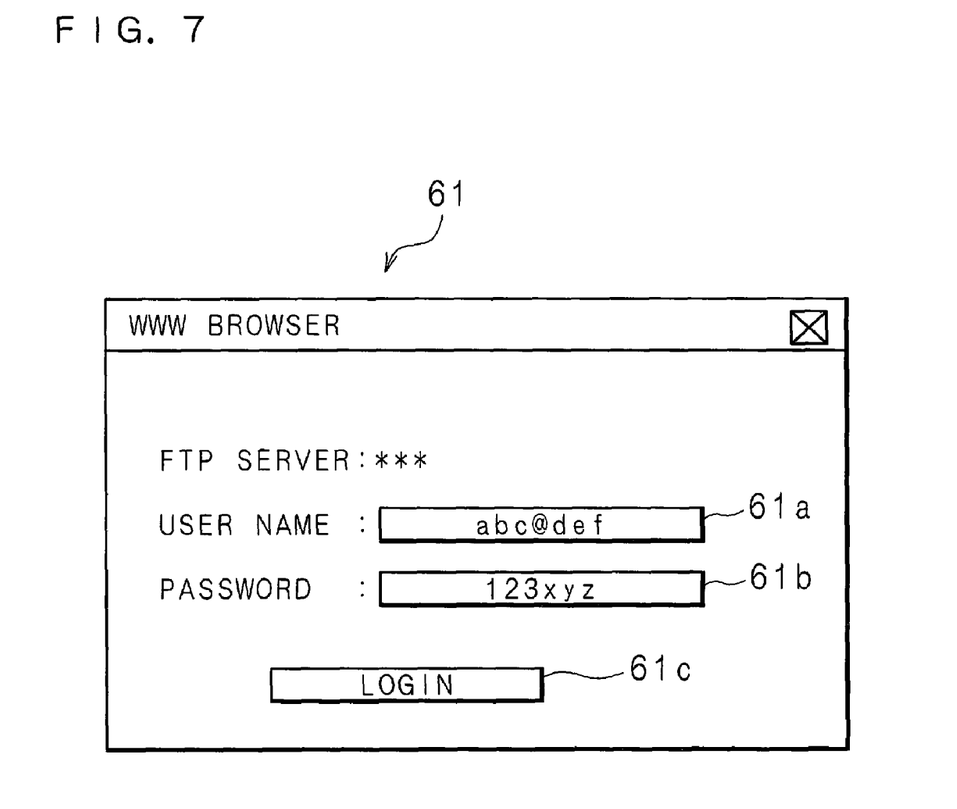
FIG. 7 is a drawing showing the login-input screen of a personal computer.

The browser is such that when it receives this NG information it displays a screen for inputting the user name and password (see FIG. 7). After the user inputs the user name and password on this screen, a login request is performed again [4], and the PC 20 sends the set user name and password to the MFP 1 [5].

The MFP 1 performs verification again to check whether the newly inputted user name and password match the valid user name and password. When they match, the MFP 1 notifies the PC 20 that verification is successful, and after that sends data that is stored on the memory card 40 according to requests from the PC 20.

Figure 4A:
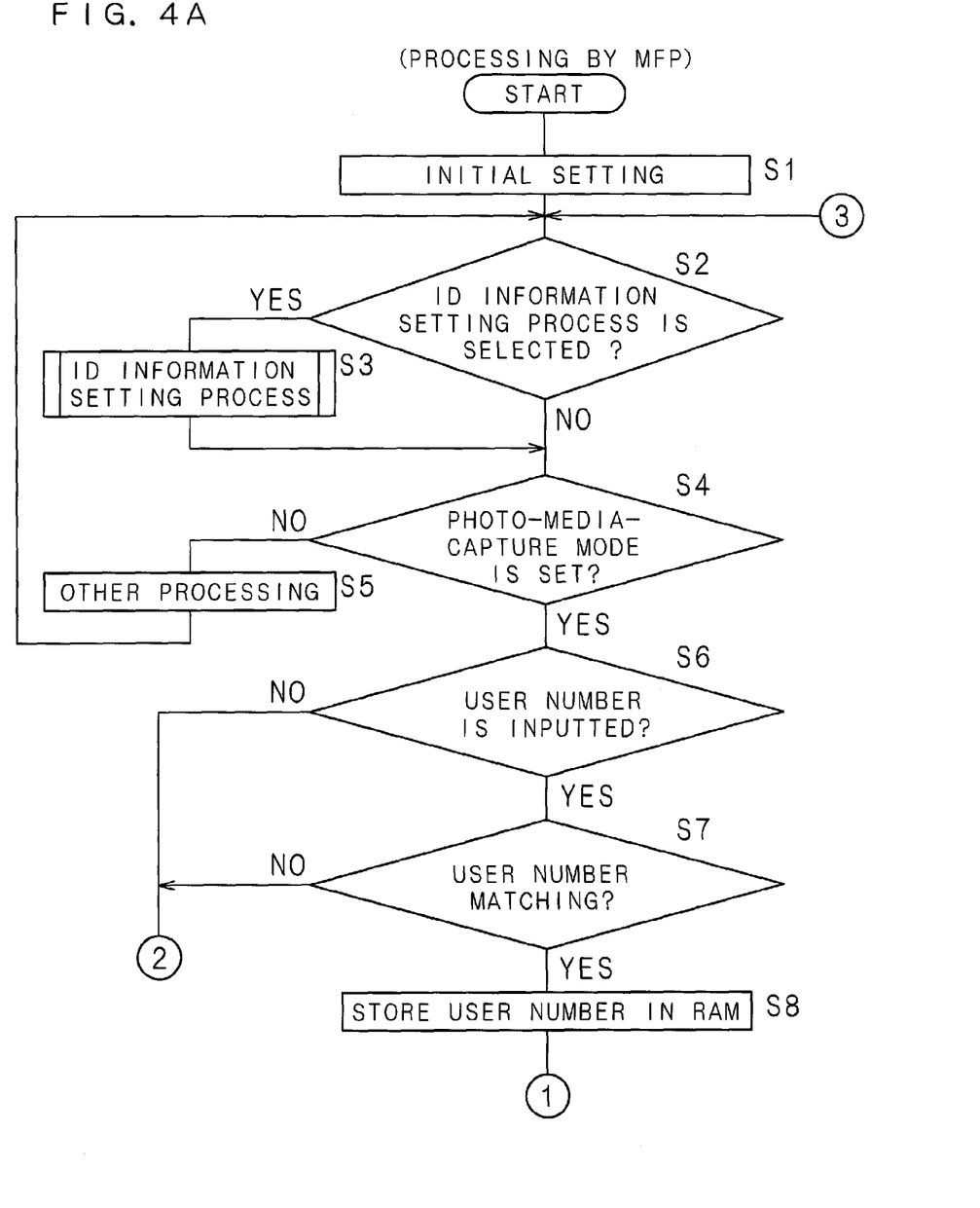
FIGS. 4A and 4B are flowcharts showing the processing by a multi-function peripheral apparatus.
Figure 4B:
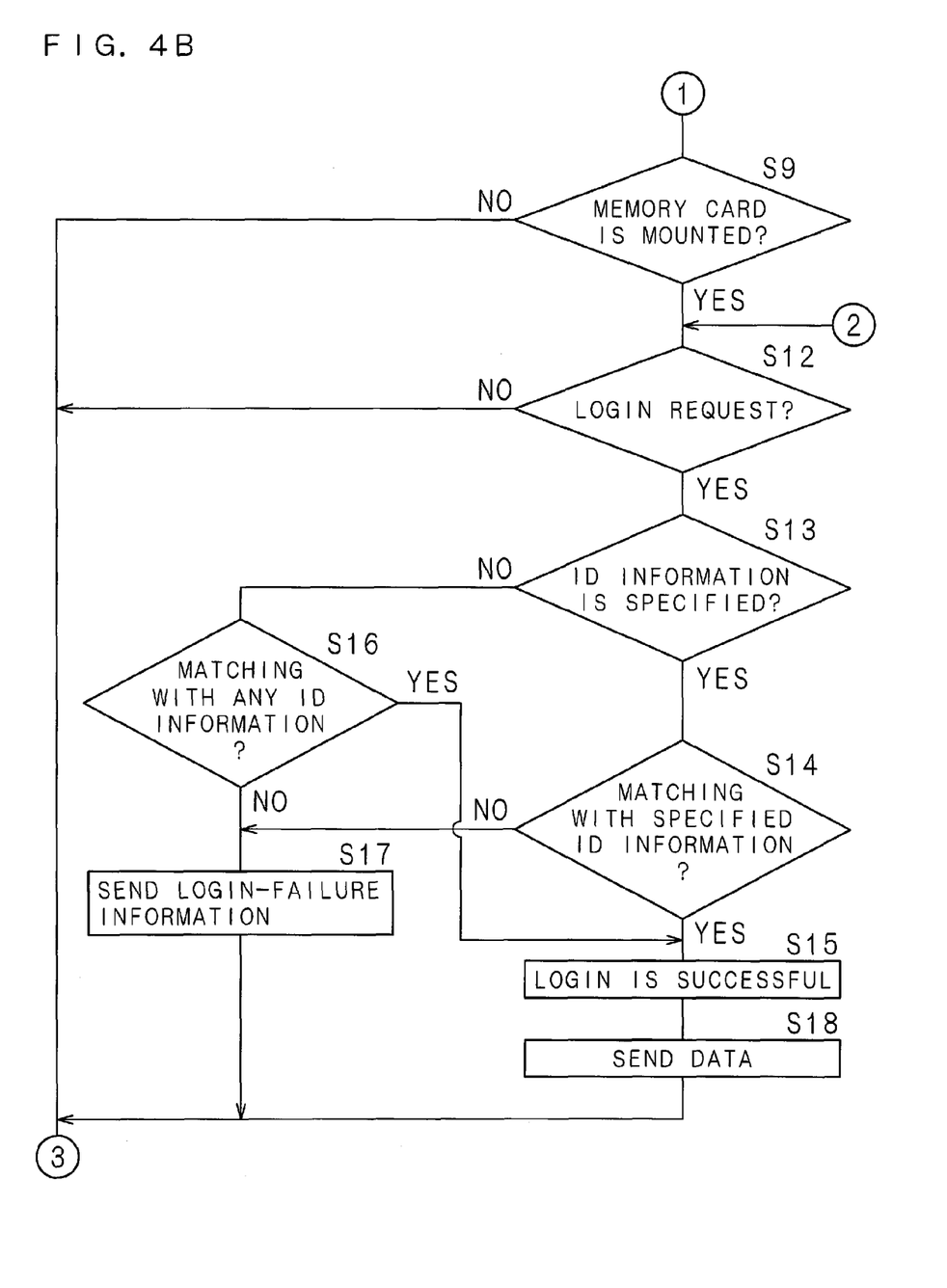
Figure 5:
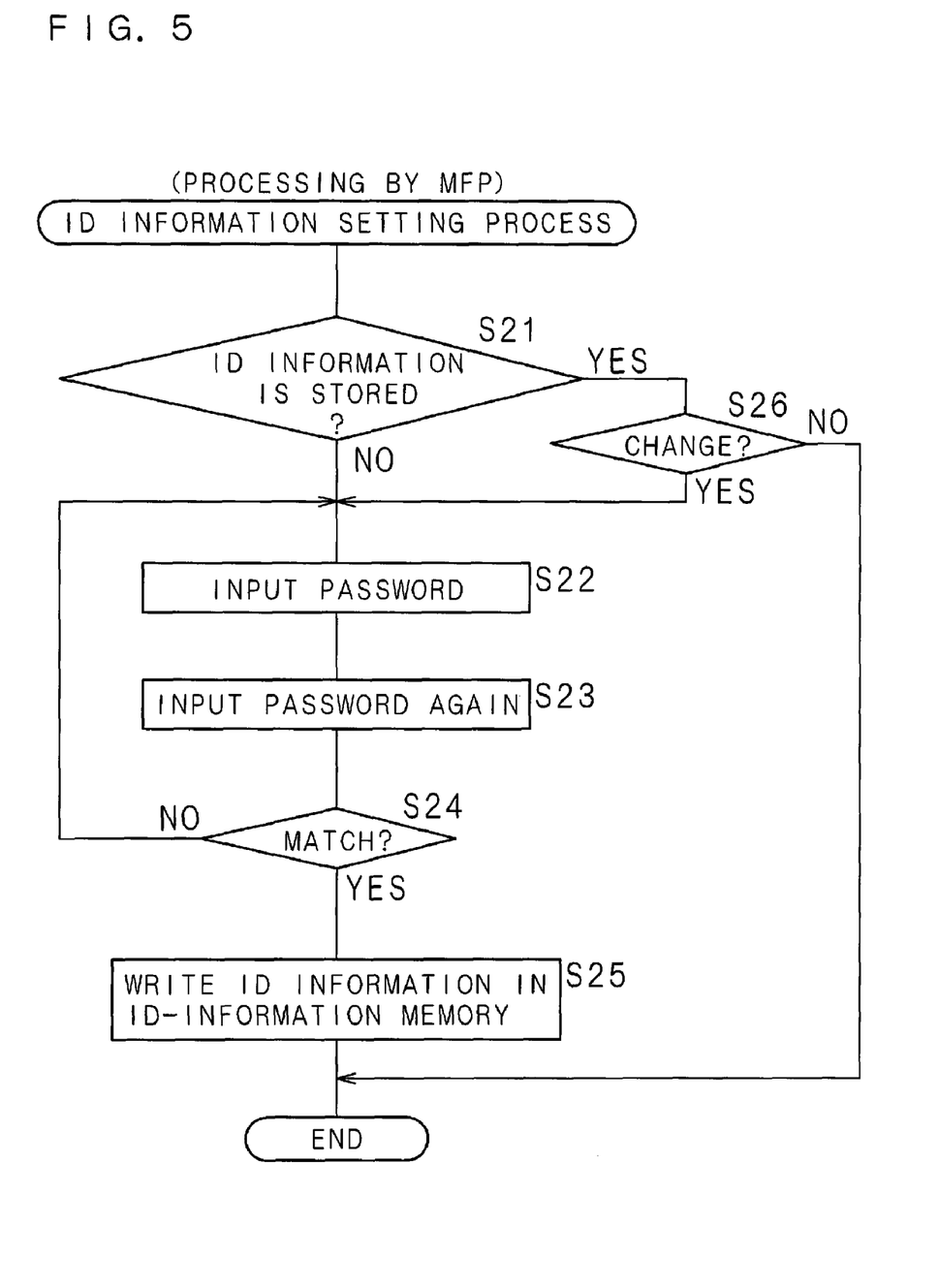
FIG. 5 is a flowchart showing the process of setting or changing ID information in a multi-function peripheral apparatus.

Next, the processing performed by the MFP 1 will be explained with reference to FIGS. 4A and 4B and FIG. 5. FIGS. 4A and 4B are flowcharts that show the main processing that is performed by the MFP 1. This main processing is activated when the power to the MFP 1 is turned ON, and is executed until the power is turned OFF.

In this processing, first, the MFP 1 performs initial setting (S1). In this initial setting it is presumed that valid ID information has not yet been specified. More specifically, the MFP 1 sets information in the user-number memory 3a in RAM 3 indicating that a user number, which specifies ID information from among the plurality of ID information stored in the ID-information memory 10, has not been set. Next, the MFP 1 determines whether to perform the ID information setting process, which is a process to set new ID information in the ID-information memory 10a or a process to change ID information that is already stored in the ID-information memory 10a (S2).

When the ID information setting process is selected (S2: YES), the MFP 1 executes the ID information setting process (S3). This ID information setting process will be described later with reference to the flowchart shown in FIG. 5. When the ID information setting process is not selected (S2: NO), or when the ID information setting process of step S3 has finished, the MFP 1 determines whether or not the photo-media-capture mode has been set (S4).

When the photo-media-capture mode has not been set (S4: NO), other processing is executed (S5). As that other processing, the MFP 1 determines whether or not a switch has been used to set another mode, and executes the processing corresponding to that switch.

When the photo-media-capture mode has been set (S4: YES), the MFP 1 determines whether or not the user number corresponding to the ID number has been inputted (S6). When the user number has been inputted (S6: YES), the MFP 1 determines whether or not the inputted user number matches any of the plurality of ID information stored in the ID-information memory 10a (S7). When there is matching ID information (S7: YES), the MFP 1 stores that user number in the user-number memory 3a (S8).

In the judgment process of step S6, when the user number has not been inputted (S6: NO), or in the judgment process of step S7, when the user number does not match any of the plurality of ID information stored in the ID-information memory 10a (S7: NO), or when the processing of step S8 has finished, the MFP 1 determines whether or not a memory card 40 is mounted in the memory-card unit 8 (S9).

When a memory card 40 is mounted (S9: YES), the MFP 1 determines whether or not a login request has been received via the LAN 50 (S12). When a login request has been received (S12: YES), the MFP 1 determines whether or not any of the plurality of ID information has been specified (S13). When a user number is stored in the user-number memory 3a of the RAM 3 as described above, the MFP 1 determines in this judgment that ID information has been specified, and when no user number is stored, it determines that no ID information has been specified.

When ID information is specified (S13: YES), the MFP 1 determines whether or not the user name and password that are attached to the login request match both the user name and password of the specified ID information (S14). When the user name and password attached to the login request match both the user name and password of the specified ID information (S14: YES), the MFP 1 notifies the device making the login request that login is successful (S15), and after that, when there is a request from that device to send data that is stored on the memory card 40, sends that data (S18).

On the other hand, in the processing of step S14, when the user name and password attached to the login request do not match both the user name and password of the specified data (S14: NO), the MFP 1 notifies the device making the login request that login fails (S17). In the judgment processing of step S13, when it is determined that ID information is not specified (S13: NO), the MFP 1 determines whether or not the user name and password that are attached to the login request match any of the respective user names and passwords of the plurality of ID information stored in the ID-information memory 10a (S16). When the user name and password that are attached to the login request match both the user name and password of any of the plurality of ID information stored in the ID-information memory 10a (S16: YES), the MFP 1 notifies the device making the login request that login is successful (S15), and after that, when there is a request from that device to send data that is stored on the memory card 40, the MFP 1 sends that data (S18). However, when the user name and password that are attached to the login request do not match any user name and password of any of the plurality of ID information stored in the ID-information memory 10a (S16: NO), the MFP 1 notifies the device making the login request that login fails (S17).

In the judgment processing of step S9, when it is determined that there is no memory card 40 mounted in the memory-card unit 8 (S9: NO), or in the judgment processing of step S12, when it is determined that a login request has not been received (S12: NO), or when the processing of step S17 or step S18 has ended, the procedure is returned to the processing of step S2.

As is explained above based on the flowcharts shown in FIGS. 4A and 4B, when ID information corresponding to a plurality of users is stored, and ID information from among that ID information is specified, only when a login request using that ID information is made via the LAN 50, the login request is accepted, and when a login request is performed using ID information that is different from that ID information, the login request is not accepted. Therefore, when it is not desirable that data stored on a memory card be obtainable by all of the plurality of users for which ID information is stored, it is possible to specify certain ID information, and only specified users can obtain the data stored on the memory card. In this way it is possible to prevent data stored on a memory card from being leaked to unspecified persons.

On the other hand, when ID information is not specified and a login request is performed using certain ID information from among the plurality of ID information via the LAN 50, that request is accepted, however, when a login request is performed using ID information that is different from any of the plurality of ID information, that request is not accepted. Therefore, depending on the contents of the data that is stored on the memory card, it is possible to specify the case in which only users that are specified from among users registered in the MFP 1 can obtain that data, or to specify the case in which all users registered in the MFP 1 can obtain that data. This makes it possible to prevent data from being disclosed or leaked according to the contents of the data stored on the memory card.

Next, the ID information setting process, which is the processing of step S3 in the flowchart shown in FIG. 4A, will be explained with reference to FIG. 5. This ID information setting process is a process that is performed by the MFP 1 to write ID information to or change ID information in the ID-information memory 10a of the flash memory 10. FIG. 5 is a flowchart showing the ID information setting process.

First, the MFP 1 determines whether or not valid ID information is already stored in the ID-information memory 10a (S21). When ID information is not stored (S21: NO), a screen is displayed for the user to input ID information, and the MFP 1 waits for input from the user. When the user inputs a user name and password, the inputted user name and password are entered (S22) and to verify the password, a request is given to input the password again. After the user inputs the password again, that password is entered (S23). Next, the MFP 1 determines whether or not the password entered in the processing of step S22 matches the password that is re-entered in the processing of step S23 (S24).

When these passwords match (S24: YES), the MFP 1 regards the password as being correctly input, and writes that password and user name in the ID-information memory 10a (S25), then ends this password-input process. When these passwords do not match (S24: NO), the procedure is returned to the processing of step S22. On the other hand, in the judgment processing of step S21 when a valid user name and password are already stored in the ID-information memory 10a (S21: YES), a screen (not shown in the figure) is displayed for the user to select whether or not to change that password, and the MFP 1 determines whether or not the user gives an instruction to change the password (S26).

When it is determined that an instruction to change the password is given (S26: YES), the procedure advances to the processing of step S22. However, when it is determined that an instruction to change the password is not given, this password-input process ends. In the judgment process of step S26, when it is determined that an instruction is given by the user to change the user name and password, a screen is displayed for inputting the current user name and password, and when the user inputs a correct user name and password, the procedure advances to the processing of step S22; however, when the user does not input a correct user name and password, the process may be such that changing of the password cannot be performed.

As described above, when a user name and password are not stored in the ID-information memory 10a, the user is able to set a user name and password, and when a user name and password are already stored, the user is able to change that user name and password. When changing the user name or password, it is possible to make changes after the current user name and password are inputted correctly; however, when the current user name and password are not inputted correctly, it is not possible to change the user name or password, so it is possible to prevent the user name and password from being changed improperly.

Figure 6:
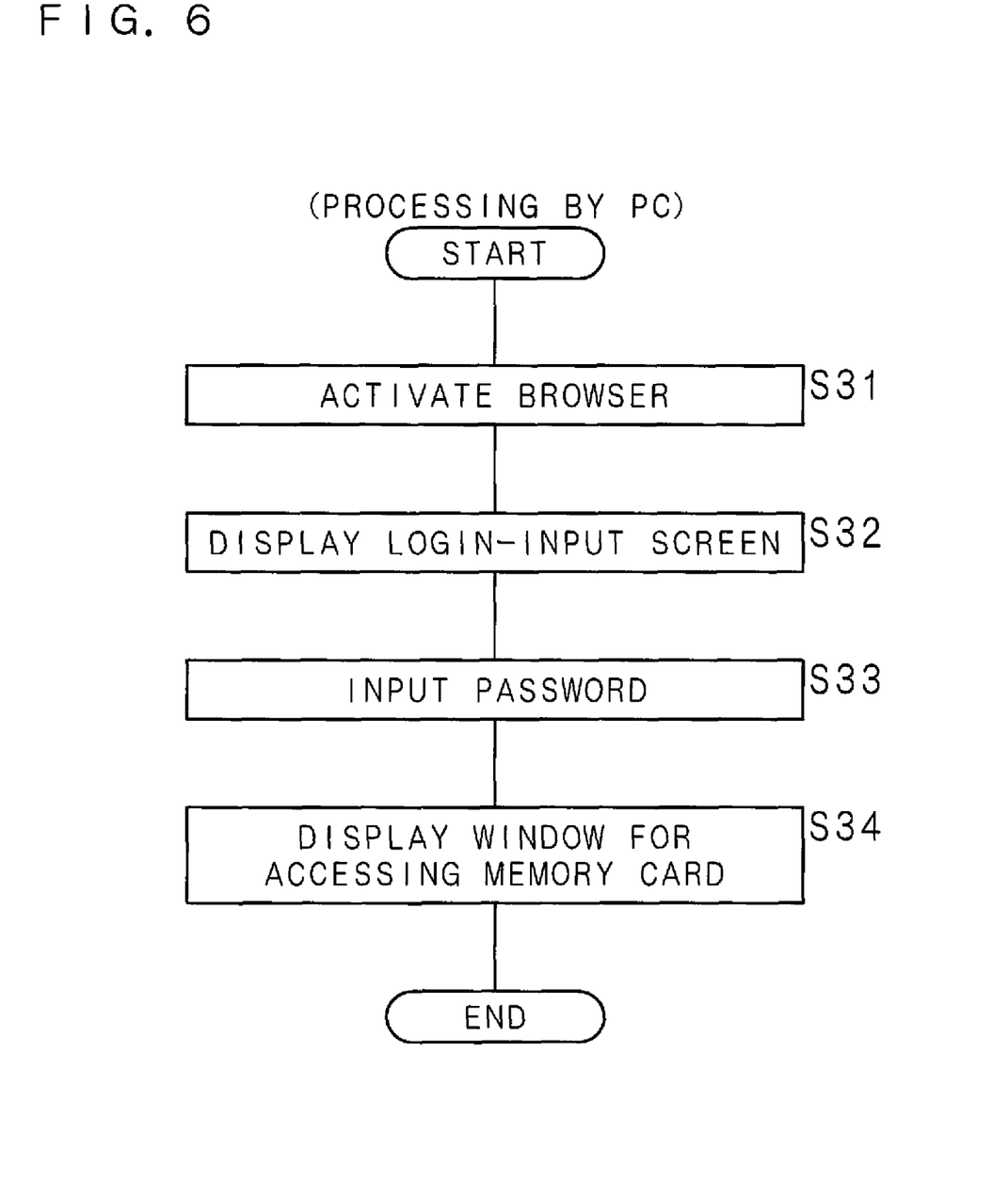
FIG. 6 is a flowchart showing the processing by a personal computer.

Next, the login process performed by the PC 20 will be explained with reference to FIG. 6 and FIG. 7. FIG. 6 is a flowchart showing the processing by the PC 20, and FIG. 7 is a drawing of a login-input screen that is displayed on the display unit 25 of the PC 20.

When accessing a memory card 40 that is mounted in a memory-card unit 8, first the PC 20 activates the browser and logs in to the MFP 1 (S31). When logging in, the user name and default password that are already set in the PC 20 are sent to the MFP 1.

The default password does not match the valid password, so information indicating that login fails is sent from the MFP 1 to the PC 20.

Normally, a user name is already registered in the PC 20, so that user name is automatically displayed and the user only needs to input the password. However, when the PC 20 receives the information indicating that login fails, it displays a login-input screen as shown in FIG. 7 for inputting a user name and password (S32).

After the password is inputted (S33), the PC 20 sends a login request with the user name and password to the MFP 1. When the password is the correct password, the MFP 1 will send information indicating that login is successful, and according to that information, the PC 20 displays a window for accessing the memory card 40 (S34) and waits for an instruction from the user.

FIG. 7 is a drawing of the login-input screen 61, and as described above, this screen is displayed when information indicating that login from the PC 20 fails is received. This login-input screen 61 displays a box 61a for inputting the user name, a box 61b for inputting the password, and a login button that sends an instruction to perform the login process.

Normally, a preset user name is automatically set in the box 61a for inputting the user name, however, when necessary, that user name can be changed by using the mouse to place the cursor in the box 61a. The password is inputted in the box 61b for inputting the password by placing the cursor in the box 61b and using the keyboard. Here, an example is given in which a combination of numbers and letters are used '123xyz', however, the characters that are displayed in the box 61b are displayed as '******' so that they are not discernable by other people. After the user name and password have been inputted as described above, a login request is issued from the PC 20 to MFP 1 by clicking on the login button 61c.

As is explained above, in the MFP 1, when ID information from among ID information corresponding to a plurality of users is specified, only that specified ID information becomes valid ID information, and when no ID information is specified, all of the plurality of ID information becomes valid ID information.

The present invention is explained based on the embodiment described above, however the invention is not limited to the embodiment above, and as can be easily imagined, the embodiment can be modified or changed within the range of the invention.

For example, in the embodiment above, ID information corresponding to a plurality of users is stored in the flash memory 10 of the MFP 1, and ID information from among that plurality of ID information is specified, however, it is also possible to store ID information for a plurality of users on the memory card 40, and to specify ID information from among the plurality of ID information stored on the memory card 40.

Also, in the embodiment described above, ID information is specified from among a plurality of ID information by inputting a user number that corresponds to ID information, however, it is also possible to display user numbers corresponding to a plurality of ID information on a display, and have the user operate the cursor to specify a user number. Moreover, this operation of specifying a user number is described as being performed using the operation unit 9 of the MFP 1, however, it could also be performed from the PC 20. In other words, from the PC 20, the user number could be inputted by operating the operation unit 27, or by displaying user numbers corresponding to a plurality of ID information and operating the cursor to specify a user number.

Furthermore, in the embodiment described above, by inputting a user number corresponding to ID information, ID information is specified from among a plurality of ID information, however, it is also possible to specify letters or symbols that correspond to a user instead of a user number. By doing so, it is possible to specify ID information from among a plurality of ID information using simple operation.

Also, in the embodiment described above, the user inputs the user number before mounting a memory card 40 in the memory-card unit 8, and the user is specified, however, it is also possible to input the user number after a memory card 40 has been mounted, or to display a plurality of ID information on the display screen 9a and specify ID information from among that ID information.

Moreover, in the embodiment described above, a card reader (memory-card unit 8) is assembled in the MFP 1, however, a device having the unique function of a card reader or card reader/writer could also be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A removable-medium apparatus that outputs data that is stored on a removable medium via a network, comprising:
   a memory unit that stores a plurality of ID information for accessing said removable medium;
   a receiving unit that receives an instruction for specifying ID information from among the plurality of ID information that is stored in said memory unit;
   a judgment unit that determines whether or not ID information that is entered via said network matches the ID information that is specified through said receiving unit; and
   a control unit that performs a control so that data that is stored on said removable medium is outputted via said network when said judgment unit determines that the entered ID information matches the specified ID information, and so that data that is stored on said removable medium is not outputted via said network when said judgment unit determines that the entered ID information does not match the specified ID information.

2. The removable-medium apparatus of claim 1, wherein said judgment unit determines whether or not ID information that is entered via said network matches any of the plurality of ID information that is stored in said memory unit, when none of the plurality of ID information that is stored in said memory unit is specified through said receiving unit; and
   said control unit performs a control so that data that is stored on said removable medium is outputted via said network when said judgment unit determines that the entered ID information matches any of the plurality of ID information that is stored in said memory unit, and so that data that is stored on said removable medium is not outputted via said network when said judgment unit determines that the entered ID information does not match any of the plurality of ID information that is stored in said memory unit.

3. The removable-medium apparatus of claim 1, wherein said receiving unit receives the instruction for specifying ID information from among the plurality of ID information before said removable medium is mounted.

4. The removable-medium apparatus of claim 1, wherein said receiving unit includes an input unit for inputting characters or symbols that correspond to ID information from among the plurality of ID information, and receives the instruction for specifying ID information from among the plurality of ID information according to characters or symbols that are inputted by said input unit.

5. A removable-medium apparatus in which a removable medium is mounted that stores data and a plurality of ID information for access, and which outputs data that is stored on said removable medium via a network, comprising:
   a receiving unit that receives an instruction for specifying ID information from among the plurality of ID information that is stored on said removable medium;
   a judgment unit that determines whether or not ID information that is entered via said network matches the ID information that is specified through said receiving unit; and
   a control unit that performs a control so that data that is stored on said removable medium is outputted via said network when said judgment unit determines that the entered ID information matches the specified ID information, and so that data that is stored on said removable medium is not outputted via said network when said judgment unit determines that the entered ID information does not match the specified ID information.

6. The removable-medium apparatus of claim 5, wherein said judgment unit determines whether or not ID information that is entered via said network matches any of the plurality of ID information that is stored on said removable medium, when none of the plurality of ID information that is stored on said removable medium is specified through said receiving unit; and
   said control unit performs a control so that data that is stored on said removable medium is outputted via said network when said judgment unit determines that the entered ID information matches any of the plurality of ID information that is stored on said removable medium, and so that data that is stored on said removable medium is not outputted via said network when said judgment unit determines that the entered ID information does not match any of the plurality of ID information that is stored on said removable medium.

7. The removable-medium apparatus of claim 5, wherein said receiving unit receives the instruction for specifying ID information from among the plurality of ID information before said removable medium is mounted.

8. The removable-medium apparatus of claim 5, wherein said receiving unit includes an input unit for inputting characters or symbols that correspond to ID information from among the plurality of ID information, and receives the instruction for specifying ID information from among the plurality of ID information according to characters or symbols that are inputted by said input unit.

9. A control method for controlling a removable-medium apparatus that outputs data that is stored on a removable medium via a network, and that has a memory unit that stores a plurality of ID information for accessing said removable medium, comprising steps of:
   specifying ID information from among the plurality of ID information that is stored in said memory unit;
   determining whether or not ID information that is entered via said network matches the specified ID information; and
   performing a control so that data that is stored on said removable medium is outputted via said network when it is determined that the entered ID information matches the specified ID information, and so that data that is stored on said removable medium is not outputted via said network when it is determined that the entered ID information does not match the specified ID information.

10. The control method for a removable-medium apparatus of claim 9, wherein,
when none of the plurality of ID information that is stored in said memory unit is specified, it is determined whether or not the ID information that is entered via said network matches any of the plurality of ID information that is stored in said memory unit; and
a control is performed so that data that is stored on said removable medium is outputted via said network when it is determined that the entered ID information matches any of the plurality of ID information that is stored in said memory unit, and so that data that is stored on said removable medium is not outputted via said network when it is determined that the entered ID information does not match any of the plurality of ID information that is stored in said memory unit.

11. A method for controlling a removable-medium apparatus in which a removable medium is mounted that stores data and a plurality of ID information for access, and which outputs data that is stored on said removable medium via a network, comprising steps of:
specifying ID information from among the plurality of ID information that is stored on said removable medium;
determining whether or not ID information that is entered via said network matches the specified ID information; and
performing a control so that data that is stored on said removable medium is outputted via said network when it is determined that the entered ID information matches the specified ID information, and so that data that is stored on said removable medium is not outputted via said network when it is determined that the entered ID information does not match the specified ID information.

12. The control method for a removable-medium apparatus of claim 11, wherein,
when none of the plurality of ID information that is stored on said removable medium is specified, it is determined whether or not ID information that is entered via said network matches any of the plurality of ID information that is stored on said removable medium, and
a control is performed so that data that is stored on said removable medium is outputted via said network when it is determined that the entered ID information matches any of the plurality of ID information that is stored on said removable medium, and so that data that is stored on said removable medium is not outputted via said network when it is determined that the entered ID information does not match any of the plurality of ID information that is stored on said removable medium.

13. A computer-readable medium having computer readable instructions stored thereon when executed by a computer to carry out a method of controlling a removable-medium apparatus that outputs data that is stored on a removable medium via a network, and that has a memory unit that stores a plurality of ID information for accessing said removable medium, the method comprising the steps of:
causing the computer to receive an instruction for specifying ID information from among the plurality of ID information that is stored in said memory unit;
causing the computer to determine whether or not ID information that is entered via said network matches the specified ID information; and
causing the computer to perform a control so that data that is stored on said removable medium is outputted via said network when it is determined that the entered ID information matches the specified ID information, and so that data that is stored on said removable medium is not outputted via said network when it is determined that the entered ID information does not match the specified ID information.

14. A computer-readable medium having computer readable instructions stored thereon when executed by a computer to carry out a method of controlling a removable-medium apparatus in which a removable medium is mounted that stores data and a plurality of ID information for access, and which outputs data that is stored on a removable medium via a network, the method comprising the steps of:
causing the computer to receive an instruction for specifying ID information from among the plurality of ID information this is stored on said removable medium;
causing the computer to determine whether or not ID information that is entered via said network matches the specified ID information; and
causing the computer to perform a control so that data that is stored on said removable medium is outputted via said network when it is determined that the entered ID information matches the specified ID information, and so that data that is stored on said removable medium is not outputted via said network when it is determined that the entered ID information does not match the specified ID information.

15. A removable-medium apparatus that outputs data that is stored on a removable medium via a network, comprising:
a memory device that stores a plurality of ID information for accessing said removable medium;
a receiving device that receives an instruction for specifying ID information from among the plurality of ID information that is stored in said memory device; and
a processor capable of performing the operations of:
determining whether or not ID information that is entered via said network matches the ID information that is specified through said receiving device; and
performing a control so that data that is stored on said removable medium is outputted via said network when it is determined that the entered ID information matches the specified ID information, and so that data that is stored on said removable medium is not outputted via said network when it is determined that the entered ID information does not match the specified ID information.

16. A removable-medium apparatus in which a removable medium is mounted that stores data and a plurality of ID information for access, and which outputs data that is stored on said removable medium via a network, comprising:
a receiving device that receives an instruction for specifying ID information from among the plurality of ID information that is stored on said removable medium; and
a processor capable of performing the operations of:
determining whether or not ID information that is entered via said network matches the ID information that is specified through said receiving device; and
performing a control so that data that is stored on said removable medium is outputted via said network when it is determined that the entered ID information matches the specified ID information, and so that data that is stored on said removable medium is not outputted via said network when it is determined that the entered ID information does not match the specified ID information.

17. A removable-medium apparatus that outputs data that is stored on a removable medium via a network; comprising:
- memory means for storing a plurality of ID information for accessing said removable medium;
- specification means for specifying ID information from among the plurality of ID information stored by said memory means;
- judgment means for determining whether or not ID information that is entered via said network matches the ID information that is specified by said specification means; and
- control means for performing a control so that data that is stored on said removable medium is outputted via said network when said judgment means determines that the entered ID information matches the specified ID information, and so that data that is stored on said removable medium is not outputted via said network when said judgment means determines that the entered ID information does not match the specified ID information.

18. A removable-medium apparatus in which a removable medium is mounted that stores data and a plurality of ID information for access, and which outputs data that is stored on said removable medium via a network, comprising:
- specification means for specifying ID information from among the plurality of ID information that is stored on said removable medium;
- judgment means for determining whether or not ID information that is entered via said network matches the ID information that is specified by said specification means; and
- control means for performing a control so that data that is stored on said removable medium is outputted via said network when said judgment means determines that the entered ID information matches the specified ID information, and so that data that is stored on said removable medium is not outputted via said network when said judgment means determines that the entered ID information does not match the specified ID information.

19. A removable-medium apparatus that outputs data that is stored on a removable medium, comprising:
- a memory unit that stores a plurality of ID information for accessing said removable medium;
- a receiving unit that receives an instruction for specifying ID information from among the plurality of ID information that is stored in said memory unit;
- a judgment unit that determines whether or not ID information that is entered matches the ID information that is specified through said receiving unit; and
- a control unit that performs a control so that data that is stored on said removable medium is outputted when said judgment unit determines that the entered ID information matches the specified ID information, and so that data that is stored on said removable medium is not outputted when said judgment unit determines that the entered ID information does not match the specified ID information.

20. A removable-medium apparatus in which a removable medium is mounted that stores data and a plurality of ID information for access, and which outputs data that is stored on said removable medium, comprising:
- a receiving unit that receives an instruction for specifying ID information from among the plurality of ID information that is stored on said removable medium;
- a judgment unit that determines whether or not ID information that is entered matches the ID information that is specified through said receiving unit; and
- a control unit that performs a control so that data that is stored on said removable medium is outputted when said judgment unit determines that the entered ID information matches the specified ID information, and so that data that is stored on said removable medium is not outputted when said judgment unit determines that the entered ID information does not match the specified ID information.

21. A control method for controlling a removable-medium apparatus that outputs data that is stored on a removable medium, and that has a memory unit that stores a plurality of ID information for accessing said removable medium, comprising steps of:
- specifying ID information from among the plurality of ID information that is stored in said memory unit;
- determining whether or not ID information that is entered matches the specified ID information; and
- performing a control so that data that is stored on said removable medium is outputted when it is determined that the entered ID information matches the specified ID information, and so that data that is stored on said removable medium is not outputted when it is determined that the entered ID information does not match the specified ID information.

22. A method for controlling a removable-medium apparatus in which a removable medium is mounted that stores data and a plurality of ID information for access, and which outputs data that is stored on said removable medium, comprising steps of:
- specifying ID information from among the plurality of ID information that is stored on said removable medium;
- determining whether or not ID information that is entered matches the specified ID information; and
- performing a control so that data that is stored on said removable medium is outputted when it is determined that the entered ID information matches the specified ID information, and so that data that is stored on said removable medium is not outputted when it is determined that the entered ID information does not match the specified ID information.

* * * * *